UNITED STATES PATENT OFFICE.

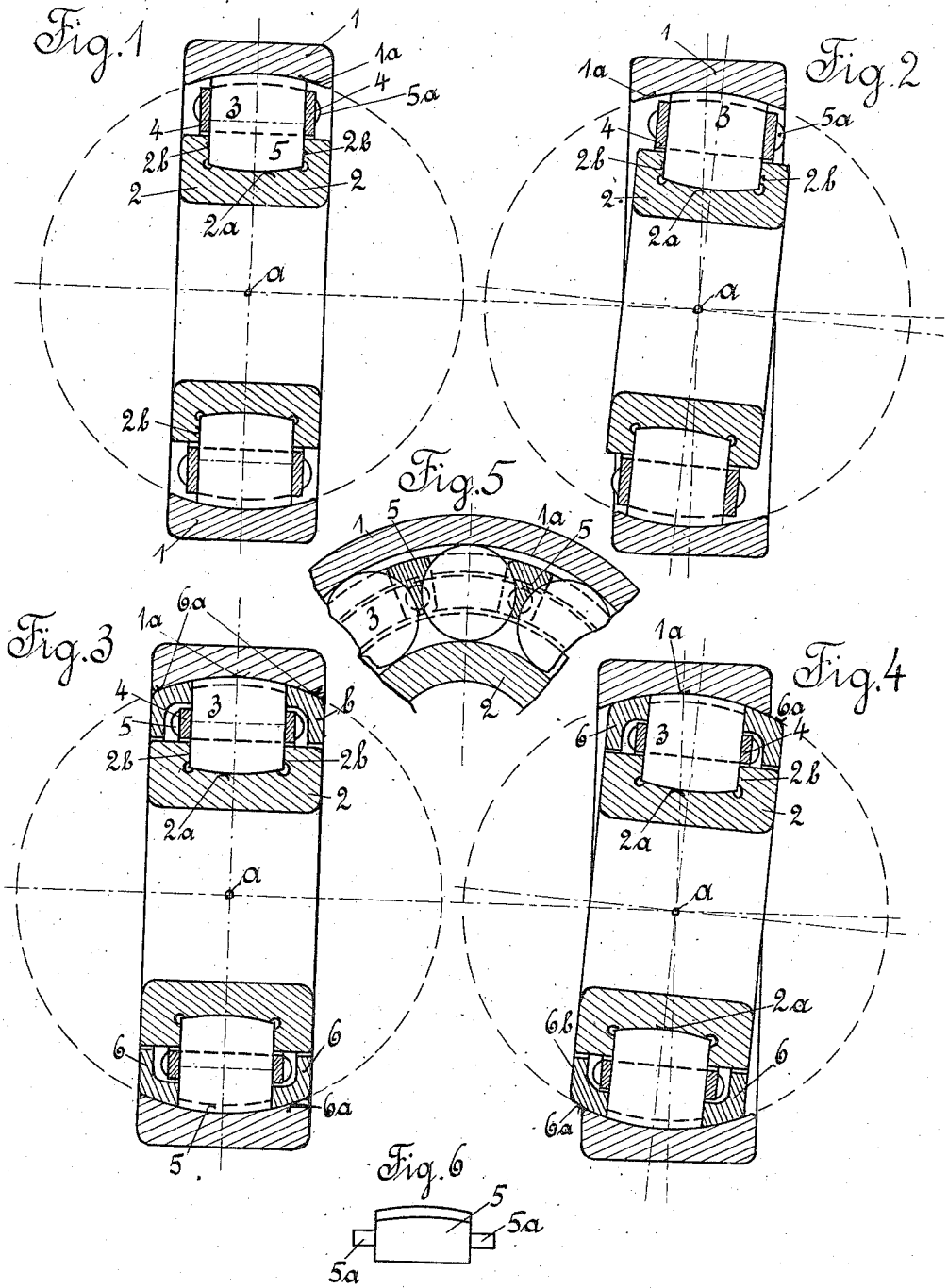

JOHANN H. MODLER, OF SCHWEINFURT, GERMANY.

ROLLER-BEARING.

1,226,685.

Specification of Letters Patent.

Patented May 22, 1917.

Application filed February 8, 1913. Serial No. 747,084.

*To all whom it may concern:*

Be it known that I, JOHANN H. MODLER, a subject of the Emperor of Germany, and resident of Schweinfurt a. M., Germany, have invented certain new and useful Improvements in Roller-Bearings, of which the following is a specification.

The object of my invention is to provide a roller bearing of the class comprising inner and outer concentric rings having raceways, with rolling members therebetween so arranged as to resist end thrusts and to permit relative angular movements of the rings with respect to one another, whereby the rollers will run on the largest diameter of the raceway of the outer ring at all times whether the inner ring be parallel with the outer ring or tilted slightly with respect thereto.

A further object of my invention is to provide means to aid the rollers in resisting end thrust between the raceways while permitting the rollers and raceways to have angular movement relative to one another as before stated.

My invention comprises novel details of improvement and combinations of parts that will be more fully hereinafter set forth and then pointed out in the claims.

Reference is to be had to the accompanying drawings forming part hereof, wherein, Figure 1 is a central section of a roller bearing embodying my invention;

Fig. 2 is a similar view, showing the inner ring and its rollers tilted with respect to the outer ring;

Fig. 3 is a view similar to Fig. 1, showing the bearing provided with end-thrust resisting-members between the rings;

Fig. 4 is a view similar to Fig. 3 illustrating the inner ring and end-thrust resisting members tilted with respect to the outer ring;

Fig. 5 is a detail section through Fig. 3, and

Fig. 6 is a detail of a separator.

In the drawings the numerals 1 and 2 respectively represent outer and inner concentric rings or bearing members, the outer ring having the inner raceway $1^a$, and the inner ring having the outer raceway $2^a$. The raceway $1^a$ is transversely curved on an arc described around the transverse axis $a$ of the concentric rings, and the rollers 3 fitted between said raceways are longitudinally shaped to correspond to the transverse curvature of the raceway $1^a$. The raceway $2^a$ is also curved to correspond to the peripheral lengthwise curvature of the rollers 3, so that said rollers will roll freely between said raceways in all positions that said rings 1 and 2 may assume with relation to one another, as illustrated in Figs. 2 and 4. The raceway $2^a$ is cut somewhat deeply in the ring 2, providing side shoulders $2^b$ at the ends of the rollers 3, between which shoulders said rollers fit somewhat snugly and yet with sufficient freedom for proper rotation, whereby side thrust upon ring 2 will be transmitted directly to rollers 3, and the latter are maintained in proper positions and have endwise or angular movement equally with ring 2. At 4 are retaining rings at the ends of rollers 3, and at 5 are separators between rollers 3, suitably shaped on the faces to coact with said rollers, which separators are shown provided with studs or projections $5^a$ that pass through corresponding holes in the retaining rings 4, and may be headed over to maintain rings 4 and separators 5 in proper relation.

With the construction described, rollers 3 will always roll on the largest diameter of the raceway $1^a$ of the outer ring, whether the rings 1 and 2 be parallel, as in Figs. 1 and 3, or whether the rings tilt or incline angularly with respect one to another, as illustrated in Figs. 2 and 4. When said rings 1 and 2 assume an angular relation with respect to one another, the side shoulders $2^b$ of inner ring 2 cause rollers 3 to be retained relatively to ring 2, so that the rollers are caused to bear properly upon the raceways $1^a$, $2^a$, in any position which said rollers may assume from an endwise movement thereof within raceway $1^a$. The shoulders $2^b$ also, by abutting against the ends of rollers 3, serve with the latter in conjunction with the rings, to resist end thrust upon one or both rings 1, 2, in any position that the latter assume with relation to one another.

To afford end thrust resistance additional to that afforded by the rollers 3 between the raceways, while at the same time permitting the inner and outer rings to assume an angular relation with respect to one another, I provide end-thrust resisting-members 6, located between the rings 1, 2 and at the ends of rollers 3, which members are shown in ring-like form having their outer surfaces 6ª curved transversely to correspond to the transverse curvature of raceway 1ª, the inner circumference 6ᵇ of the members 6 substantially corresponding to the annular outer surfaces 2ᶜ of the inner ring 2 at the sides of shoulders 2ᵇ. With this construction the ring 2 and member 6 with the rollers may assume angular relation with respect to ring 1, in manner before described, as illustrated in Fig. 4, since members 6 will have free swinging motion within raceway 1ª similar to such movement of rollers 3, but when end thrust occurs upon ring 2 or ring 1, the corresponding member 6 will, when pushed by the rollers or the outer ring, bear against raceway 1ª and serve to resist such end thrust, either when rings 1, 2, are parallel or at an angle with respect to one another.

The bearing may be assembled by fitting rollers 3 upon ring 2, with the retainer 4 in position, and then suitably tilting inner ring 2, and swinging the same into ring 1, in accordance with Figs. 1 and 2, and when the bearing illustrated in Figs. 3 and 4 is to be assembled, the end thrust members 6 may be applied upon ring 2 and then the parts may be assembled in the manner described with respect to Figs. 1 and 2.

Having now described my invention what I claim is:—

1. An oscillatory bearing having inner and outer rings provided with opposed raceways, the raceway of the outer ring being curved transversely on an arc described around the transverse axis of the bearing, the raceway of the inner ring being correspondingly curved but in a direction reverse to said curvature of the raceway of the outer ring, and rollers fitted between said raceways and being curved corresponding to the curvature of the outer ring, the inner ring having shoulders extending outwardly beyond its raceway and embracing the side faces of the rollers.

2. An oscillatory bearing having inner and outer rings provided with opposed raceways, the raceway of the outer ring being curved transversely on an arc described around the transverse axis of the bearing, the raceway of the inner ring being correspondingly curved but in a direction reverse to said curvature of the raceway of the outer ring, and rollers fitted between said raceways corresponding to the curvature of said raceways and having parallel side faces, the inner ring having shoulders extending beyond its raceway and embracing the parallel side faces of said rollers.

3. An oscillatory bearing having inner and outer rings provided with opposed raceways, and rollers between said raceways, the raceway of the outer ring being curved transversely on an arc described around the transverse axis of the bearing, the rollers being curved corresponding to the curvature of the raceway of the outer ring, the inner ring having parallel shoulders extending beyond its raceway, said shoulders being opposed to and embracing the side faces of the rollers, and ring-like members between said rings at the ends of said rollers, said members having their outer surfaces curved to correspond to the transverse curvature of the raceway of the outer ring and co-active therewith to permit said members to rock within the outer ring and to limit end thrust of said rollers within said rings.

4. An oscillatory bearing having inner and outer rings provided with opposed raceways, and rollers between said raceways, the raceway of the outer ring being curved transversely on an arc described around the transverse axis of the bearing, the rollers being curved corresponding to the curvature of the raceway of the outer ring, the inner ring having spaced shoulders extending beyond its raceway and embracing the side faces of the rollers, and ring-like members between said rings having their outer surfaces curved corresponding to the transverse curvature of the raceway of the outer ring, the rollers fitting freely between the inner side faces of said members, said members fitting freely around said inner ring outside of said shoulders, said members being adapted to rock within the outer ring and to engage the latter to limit endwise thrust of said rollers in opposite directions.

5. A self-alining roller bearing comprising, in combination, an outer race having a concave inner surface; an inner race having its outer surface formed with a continuous, peripheral groove, and with continuous, vertical flanges at the opposite edges of said groove; and a series of substantially barrel-shaped rollers interposed between said races and fitting in said groove, with their ends abutting against said flanges, whereby the latter will prevent endwise movement and resist end thrust of said rollers.

6. A self-alining roller bearing comprising, in combination, an outer race having a concave inner surface; an inner race having its outer surface formed with a continuous, peripheral groove whose bottom wall is concaved reversely to the inner surface of the outer race, and with continuous, vertical flanges at the opposite edges of said groove; a series of substantially-barrel-shaped rollers interposed between said races and fitting in said groove, with their ends abutting against said flanges, whereby the latter will prevent endwise movement and resist end thrust of said rollers; and a cage wherein said rollers are housed.

Signed at New York city, in the county of New York, and State of New York, this 3rd day of February, A. D. 1913.

JOHANN H. MODLER.